Patented July 31, 1934

1,968,799

UNITED STATES PATENT OFFICE 1,968,799

PROCESS OF PREPARING, GRINDING, OR POLISHING TOOLS

Ernst Elbel and Otto Sussenguth, Erkner, near Berlin, Germany, assignors to Bakelite Gesellschaft mit beschrankter Haftung, Berlin, Germany No Drawing. Application February 21, 1931, Serial No. 517,632. In Germany February 28, 1930

2 Claims. (Cl. 51—278)

It is well known in the art to produce grinding or polishing tools from granular abrasive materials by using phenol-aldehyde resins as binders. According to the known art, the procedure is to mix the abrasive material with the hardenable phenol resin or phenol resin composition, and then to mold into the desired form, as, for instance, into grinding wheels, by simultaneous application of heat and pressure. However, it is also possible to proceed in such a way that the phenol resin, either molten or mixed with diluents or plasticizers and after the admixture of the abrasive, is molded according to the so-called cold-molding process, either at the normal or at moderately elevated temperatures. The conversion of the hardenable phenolic resin binders contained in the molded objects is thereupon carried out by the application of heat.

This invention concerns improvements in the known processes. It has been found that the characteristics of grinding and polishing tools can be appreciably improved, if solutions of resitole resins, that is to say, solutions of phenol aldehyde resins which are in the so-called B state, are used for their production. Granular abrasive materials can be incorporated in such a resitole resin solution. Or, resoles, or a mixture of a novolak with hardening agents, can be dissolved in a liquid which will dissolve resitoles, the abrasives are then mixed in, and the mixture of abrasive and solution is heated to the formation of the resitole. Finally, it is also possible to mix the ingredients of a synthetic resin, that is, phenol, aldehyde and catalyst, with the abrasive and a solvent, which will dissolve resoles as well as resitoles, and then to carry out the condensation of the resinous components to the resitole stage. Hardeners may also be added in this step. To produce resitole solutions, or resitole solutions containing the abrasive materials, the procedure described in patent applications 295,344 of July 25, 1928, 422,683 of January 22, 1930, and 497,063 of November 20, 1930, can be followed. Briefly these applications describe the preparation of resitole solutions. In application 295,344 a resitole is incorporated as such with a suitable solvent, from the group of cyclic ketones or equivalent alcohols, their homologs and esters, hydrogenated naphthalenes, etc. In place of resitoles, resoles or A type resins or their equivalents, that is, novolak resins together with hardening agents can be used and then carried to the resitole condition in the solvents; this forms the subject matter of application 422,683. It is also possible to add the ingredients engendering resins such as a phenol and formaldehyde and react them in the presence of a resitole solvent as set out in application 497,063. A few of the solvents that can be used are hydrogenated phenols, such as hexalin, methyl-hexalin, hexahydro-betanaphthol. Various liquids, such as tetralin, or brombenzol, even though they do not dissolve resitoles, can also be added to the solvents. Such other solvents can be used as do not dissolve the B resin at normal pressure, but will dissolve the B resin when heated under pressure, such as, for example, a mixture of equal parts of benzol and methyl alcohol. Other hardenable or non-hardenable, either natural or synthetic resins can be used along with the resitoles, that is to say, as a mixture. The solutions of resitole, or the solutions of resitole containing the abrasives can still be processed when catalysts, plasticizers, hardeners, etc. are added. These materials may be added to the mixtures at any convenient stage of the preparation. A mixture of several B resins or a solution containing several B resins may also be used.

The preparation of grinding and polishing tools follow the usual manner of mixing the abrasive materials intimately with the resitole resin in solution and then producing the objects by hot-molding or by cold-molding and subsequent baking. It is, of course, possible to use any other suitable process for preparing the abrasives and the resin binders. The solvent used to dissolve the resitole resin may be entirely or partially driven off from the mixtures under the proper conditions, for example, before the hardening step.

An advantage of this invention lies especially in the fact that the grinding and polishing tools produced from B resin solutions, under otherwise similar conditions, exhibit appreciably greater mechanical strength than the products made according to the known processes. The explanation of this improvement lies in the fact that the remaining step of conversion of the phenol resin to the C state is considerably facilitated by the use of resin in the substantially polymerized B state, and that on the other hand, the solutions coat the particles of the granular abrasive material uniformly, so that a uniform distribution of the binder and, likewise, a uniform cementing-together of the individual abrasive particles is insured. Hence it follows that, by using the process of this invention, grinding tools can be made whose strength will be appreciably greater than of those products made from the identical binding mixtures, but according to the processes of the known art. If, on the other hand, grinding tools with lesser strength are desired, it is possible to produce them by following the process of this invention, but cutting down the quantity of resin binder used below the quantity used in the known processes.

Example 1

8 kilos phenol-aldehyde resin, pulverized, in resole condition, are mixed in a kneading machine with 2 kilos methyl-hexalin and 90 kilos silicon carbide grains by heating for 1 hour to 110° C. The mixture becomes tougher while emitting only slight vapors, and it is heated so long as it may still be formed into a ball by hand when cold.

The mixture is molded by the application of pressure. The pressure depends upon the degree of dryness of the mixture and normally is 300 to 600 kilos per square centimeter surface. One can also use considerably lower or higher pressures. If the heat is applied at the same time that molding is done, it is advantageous to work at a temperature of about 180° C.; lower and higher temperatures however can be used. If molding is done without simultaneous application of heat, the molded articles are hardened subsequently at 60 to 180° C. with or without the mold. The hardening process can be started first at lower temperatures and then the temperature raised gradually, or it is possible to subject the molded article from the beginning to a temperature above 100° C.

Example 2

10 kilos cresol, 2.8 kilos hexamethylenetetramine, 3 kilos hexalin and 85 kilos aluminum oxide grains are mixed in the kneading machine and processed until the condition is reached as described in Example 1.

Condensation products of phenols and formaldehyde (or substances forming formaldehyde), whose polymerization has proceeded to the point where they no longer melt on heating, but only soften, have been considered as B resins or resitoles for the purpose of this invention. These products were formerly regarded as insoluble. As a matter of fact they are insoluble in the usual solvents for phenol-aldehyde resins, such as alcohol, but as has been pointed out, they may be dissolved in certain specific liquids, or mixtures of liquids, at normal or elevated pressure, and may be processed into objects having very valuable properties.

The term "hardenable resins" as used in the present application is understood to include all those resin-like products which can be prepared in a soluble and fusible condition and, if sufficiently heated, transformed into a hard, insoluble and infusible condition. Such hardenable resins are for example the condensation products from the various phenols and aldehydes, or aldehyde-yielding bodies, as well as the mixtures of novolaks with hardening agents; also condensation products from urea and aldehydes, from polyvalent alcohols and polybasic acids, etc. As fillers we not only include the usual fillers, but also other additions to hardenable synthetic resins customary in the art, for example, plasticizing agents, fire-proofing material, non-hardenable synthetic or natural resins, or the like. Therefore the invention is not limited to the specific substances or steps or proportions stated in the examples, but it relates generally to the manufacture of grinding or polishing tools, and moldable compositions suitable for their manufacture as well as other products coming within its scope as set out in the following claims.

The following definitions are intended for the terms "resole", "resitole", and "novolak". A resole is a resin of the type hardenable by heat to a final infusible and insoluble condition but reacted only to the stage where it still melts when heated and is soluble in acetone; this is also known as the A stage. A resitole is a resin of the same type as a resole but further reacted to a B stage where it has become infusible, i. e., it does not melt though it softens decidedly on heating, and is insoluble but swells in acetone. A novolak is a distinctly different type of resinous reaction product in that practically speaking it does not harden upon heating to an infusible insoluble condition but remains soluble and fusible. The resins here defined are those made from phenols or their homologs and derivatives with a methylene or aldehyde agent as is well understood by those skilled in the art.

We claim:

1. Process of manufacturing abrasive and polishing implements which comprises mixing a solution in a solvent selected from the group of hydrogenated aromatic hydrocarbons, hexahydrogenated phenols and their esters and hydroaromatic cyclic ketones of a heat-hardenable phenol-aldehyde resin in the resitole state with an abrasive filler, molding the mixture so obtained and hardening the resin by heating.

2. Process of manufacturing abrasive and polishing implements which comprises mixing a heat-hardenable phenol-aldehyde resin in solution of a solvent selected from the group of hydrogenated aromatic hydrocarbons, hexahydrogenated phenols and their esters and hydroaromatic ketones with an abrasive filler, heating the mixture to transform the resin to the resitole state, molding the mixture and hardening the resin by heating.

ERNST ELBEL.
OTTO SUSSENGUTH.